United States Patent [19]
Mullin

[11] 3,993,027
[45] Nov. 23, 1976

[54] CAT SCRATCHING POST

[75] Inventor: A. Donald Mullin, New York, N.Y.

[73] Assignee: Lawrence Peska Associates, Inc., New York, N.Y. ; a part interest

[22] Filed: Mar. 6, 1975

[21] Appl. No.: 551,492

[52] U.S. Cl. .................................. 119/29; 119/29.5
[51] Int. Cl.[2] ......................................... A01K 29/00
[58] Field of Search ......................... 119/29, 29.5, 1

[56] References Cited
UNITED STATES PATENTS

| | | | |
|---|---|---|---|
| 2,005,817 | 6/1935 | Yoder | 119/29.5 |
| 2,894,487 | 7/1959 | Goldson | 119/29.5 X |
| 2,997,019 | 8/1961 | Bryson | 119/29 X |
| 3,159,141 | 12/1964 | Paterek | 119/29 |
| 3,486,485 | 12/1969 | Kahanick | 119/1 |

*Primary Examiner*—Hugh R. Chamblee

[57] ABSTRACT

A cat scratching post for cats and kittens to scratch and to climb, so that they avoid climbing and tearing furniture. It includes a supporting frame and a main climbing and scratching body portion normally held at an angle to the vertical wall of a room so that the cat or kitten can easily climb it, the body portion being formed of a main backing plate in the form of a wide channel, with a series of vertically stacked corrugated cardboard sheets extending out of the channel and secured adhesively or otherwise therein, so that the cats can climb up and scratch the stacked corrugated cardboard sheets.

8 Claims, 10 Drawing Figures

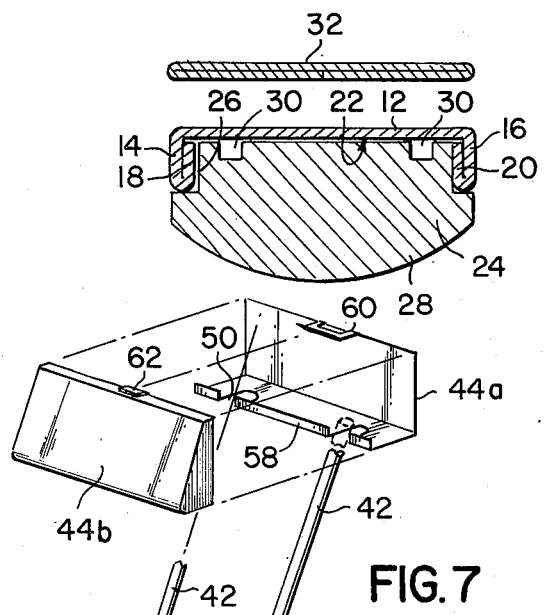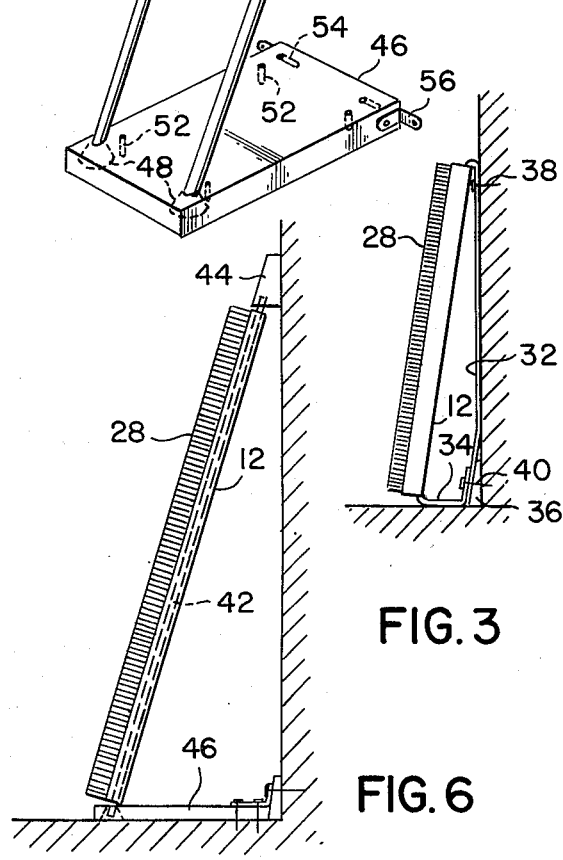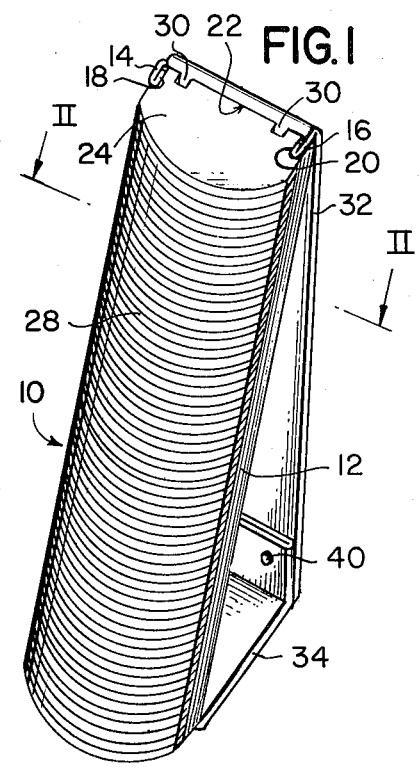

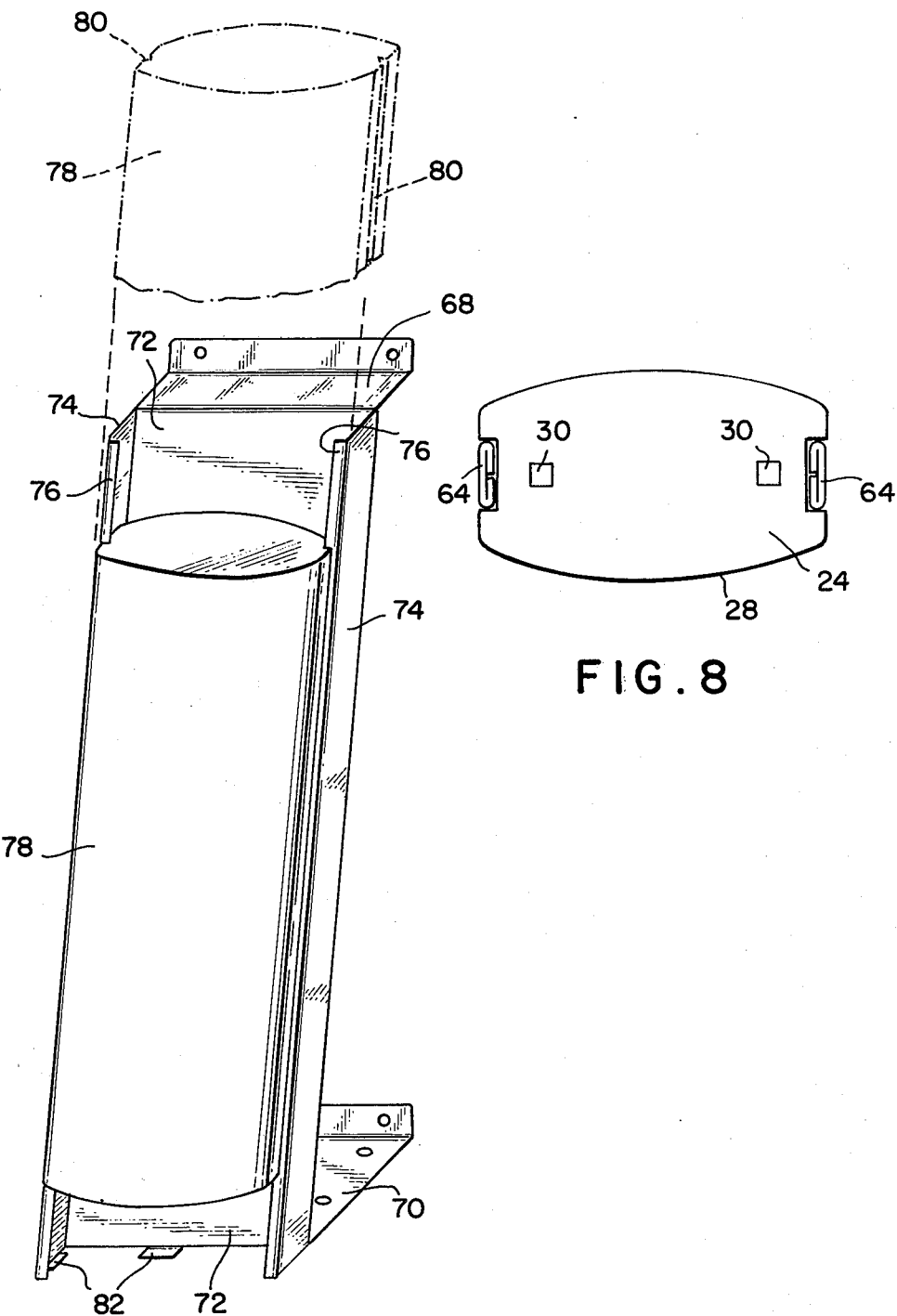

CAT SCRATCHING POST

This invention relates to improvements in devices for use by cats as play devices and scratching posts.

An object of the invention is to provide a novel and improved cat scratching post and play device, to satisfy their craving for scratching and thus to help eliminate their scratching furniture and other articles.

Another object of the invention is to provide a novel and improved cat scratching post and play device, which is made of material which is readily available and adaptable in construction to the needs of the cat.

A further object of the invention is to provide a novel and improved cat scratching post and play device, which is made of cardboard, corrugated cardboard, or other low cost material which will be attractive, and which is not so rigid or stiff as to possibly harm the claws or limbs of the cat or kitten in its use.

Still another object of the invention is to provide a novel and improved cat scratching post which is not bulky in construction, and which can be securely installed in any convenient portion of a room and attached to a wall or upright support, preferably at an angle to the vertical, for convenience of the cat.

Still a further object of the invention is to provide a novel and improved cat scratching post of the type described, in which the main scratchable element is readily detached from the supports, when it is sufficiently at the end of its useful life, and replaced with another such element.

Another object of the invention is to provide a novel and improved cat scratching post which can be made either by hand or by mass production methods at low cost, and which can be impregnated or coated with an attractive material such as catnip.

The above and other objects and advantages of the invention will become apparent from the following description of a preferred embodiment thereof, as illustrated in the accompanying drawings, forming a part hereof.

In the drawings:

FIG. 1 is a perspective view of a cat scratching device in position ready for use.

FIG. 2 is a sectional elevational view taken substantially on Plane II—II of FIG. 1 showing the main body of the device and upper mounting flap in section.

FIG. 3 is a side elevational view of the device of FIG. 1, showing a supporting floor and wall.

FIG. 4 is a side elevational view of the device of FIG. 3, showing the top securing flap cut to a short length and secured above and behind the body of the scratching element.

FIG. 5 is a side elevational view of the device of FIG. 3, showing the mounting flaps cut and the scratching element secured vertically.

FIG. 6 is a side elevational and partly sectional view of a modified form of the invention as secured to a wall using a permanent mounting fixture at the top and bottom of the device.

FIG. 7 is a detail perspective exploded view of portions of the device of FIG. 6 on an enlarged scale.

FIG. 8 is a rear elevational view of a reversible form of the scratching element shown in FIG. 6.

FIG. 9 is a front elevational view, partly in perspective showing an alternate support structure with replaceable and reversable scratching elements.

Figure 10:
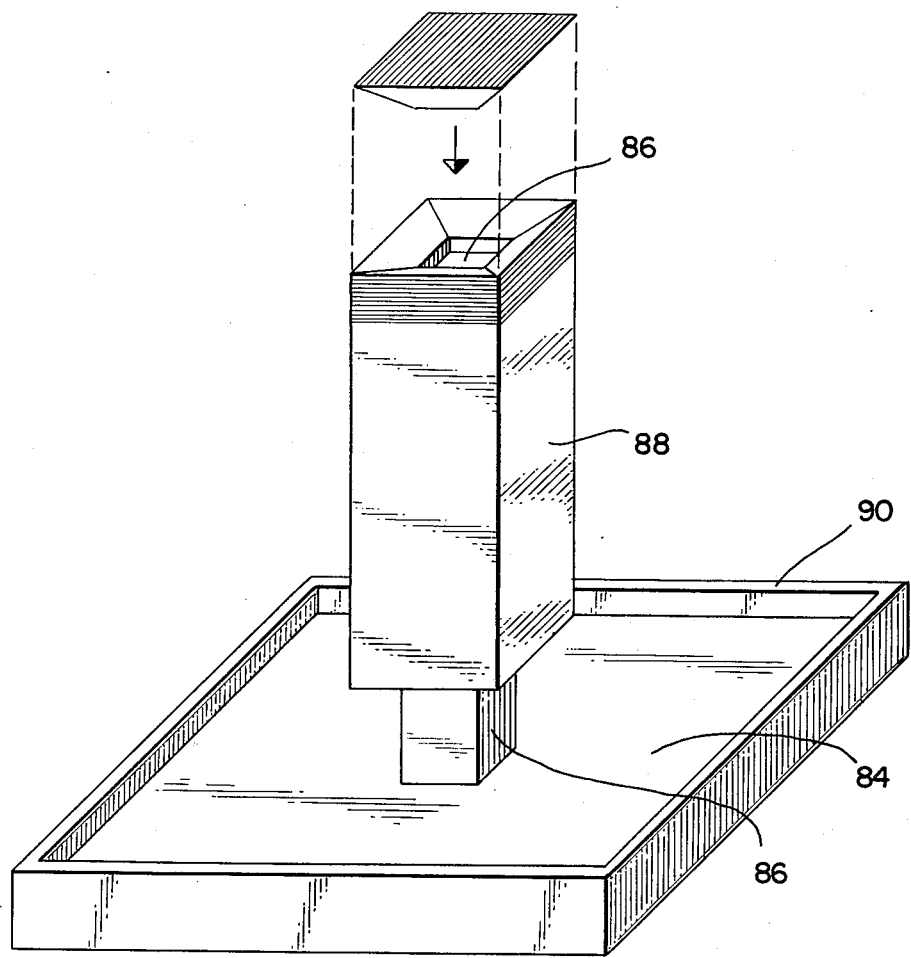
FIG. 10 is a front elevational view, partly in perspective of a self supporting and multi-dimensional scratching device.

In connection with the keeping of pets, such as cats and kittens, it has been well known by those with such pets, that they will not only climb over furniture, especially upholstered chairs and sofas, and beds, but will use such furniture and carpeting to condition their claws through a deliberate and repeated clawing, pulling and tearing action with their forepaws. This clawing activity seems to be an irresistible natural impulse for cats and people having cats have been distressed to see new or prized upholstered furniture torn apart and open by the innocent natural clawing and scratching activities of the cats.

In fact, if nothing is done to control this, the furniture will surely be ruined. The present invention seeks to ameliorate this problem by presenting the cats with the alternative of scratching posts having a highly desirable scratching surface which they can easily scratch as much as they desire, and which can be made at low cost and replaced as needed.

In order to understand clearly the nature of the invention and the best means for carrying it out, reference may be had to the drawings, in which like numerals denote similar parts throughout the several views.

As shown, there is the scratching post 10 or element itself, which includes a main backing plate 12 formed of strong sheet cardboard or other material, such as sheet steel, brass or aluminum, or even strong sheet plastics, and it has side flanges 14 and 16 formed integral therewith. Each side flange may have an integral re-entrant inner flange 18 and 20 bent inwardly as seen best in FIG. 2, for extra strength.

The backing plate 12 together with the side flanges 14 and 16 form a main channel recess or chamber 22 for the reception of a series of sheets 24 of corrugated cardboard or other suitable material being notched out as at 26 at their back-side corners for insertion into the open main channel chamber 22. The front edges 28 of the stacked sheets may be somewhat rounded as seen best in FIGS. 1 and 2 and their back edges may be notched out as shown at 30.

The stacked sheets 24 may be secured to the main channel recess 22 in any suitable manner, as by use of adhesives along their side and back edges, and may also be adhesively secured to each other as is well known in the cardboard corrugation art. They thus present to the cat an outer front surface 28 of stacked cardboard edges with the corrugations approximately perpendicular to the surface if desired and have visible from their edges. The stacked sheets 24 are formed of horizontal, planar and corrugated layers placed aternatively or in some other manner such as two planar layers for each corrugated layer, the object of which is to provide a scratching surface full of small holes into which the cat can dig its claws. It is important to note that the sheets be placed horizontally rather than vertically so that the corrugated layers do not quickly become scratched out leaving the planar layers to become a series of vertical knife-like edges that may damage the cat's claws. It is to be understood that the front surface 28 of the post contains corrugated layers as well as planar ones as shown, but are omitted since this detail is difficult to show.

As shown in FIG. 1, it is preferred to emplace the device at a slight upwardly inclined angle, so that it slopes rearwardly upwardly a bit for the convenience of the cat.

For this purpose, mounting flaps 32 and 34 are provided at the upper and lower end of the post, the flaps forming an extension of the main backing plate 12 or otherwise fastened to the ends of the post. The upper flap 32 may be folded upwards or downwards, cut off, if desired, to any suitable length, and screwed, nailed or otherwise fastened to the wall or other surface to secure the top end of the post. The lower flap 34 is normally folded back along the floor and secured with screws, nails, or otherwise fastened to the floor or base of the wall to securely anchor the bottom end of the post. Flap 34 is of such a length that when butted against a vertical wall, as shown in FIGS. 3 and 4, the post will be secured at a suitable upward and rearward incline.

FIG. 3 shows the same general arrangement as FIG. 1, except that where there may be a baseboard 36 on the wall, the parts may be bent somewhat at the bottom to accommodate the baseboard. FIG. 4 shows a further mounting possibility in which the top mounting flap 32 has been cut to a short length and positioned upwardly rather than downwardly before being fastened to the wall by means of a screw 38. The bottom flap 34 is secured to the baseboard 36 by means of screw 40 as in FIG. 3.

FIG. 5 shows how the post may be secured to a flat surface, such as a wall, by cutting off the two mounting flaps 32 and 34 to a short length and installing screws 38 and 40.

FIGS. 1 through 5 show how the device can be made entirely of cardboard with integral flaps for securing it to the wall and floor or baseboard or other surface or structure. An alternate method of securing the device but having a more convenient means of replacing the scratching element 10 can be readily accomplished by utilizing a set of permanent and re-usable mounting rods 42, and upper and lower mounting brackets 44 and 46 as shown in FIG. 6. In using this method the flaps 32 and 34 may be removed by the consumer or left off in manufacture as an alternate version of the device meant for use exclusively with the re-usable mounting fixtures. To understand clearly the nature of this alternate provision for mounting the post and best means for carrying it out, reference may be made to FIGS. 6 and 7.

The two rods or pipes, 42, made of wood, metal or other suitably rigid material are made to extend through the entire length of the post, via two holes 30 formed by the holes in each lamination of the scratching post as shown in FIG. 6. The rods 42 extend a short distance beyond each end of the post so as to fit securely into holes 48 of the lower mounting bracket 46 and slots 50 of the upper mounting bracket 44.

The lower mounting bracket 46 may be made of wood, plastic, or other suitable material, may be of rectangular or other suitable shape to provide a means of securely anchoring the lower end of the post, and is fitted with several options for permanently securing it to a baseboard of a wall, a floor or other horizontal surface. Holes 52 are to accommodate screws or nails inserted vertically through the bracket and into the floor. Holes 54 are formed at an angle so as to permit screws or nails to be installed at an angle through the bracket and into the corner formed by the floor and wall or baseboard and thus make less obvious holes in the floor. Small angle brackets 56 can be secured to predrilled holes either in the top or side edges of the main body of the lower mounting bracket and to the wall or baseboard as shown in FIGS. 6 and 7 respectively. Adhesives or other suitable options for anchoring the bracket may also be provided. Holes 48 can be tapered to a larger size toward the bottom so as to allow some variation in the angle at which rods 42 form with the bracket and yet provide a secure fit.

The top mounting bracket 44, formed of two parts, 44a and 44b, is made of metal, plastic, or other suitable material, and is of a rectangular or other suitable shape to be fastened to a vertical surface above the lower bracket 46 at a distance so as to accommodate the length of the post and secure the top ends of the rods 42 that project from the post as seen in FIG. 6. The inner part 44a may have holes for nails or screws, adhesive backing, and any other suitable options for securing it to a wall or other vertical surface. The outer part 44b is formed in conjunction with 44a so as to lock and snap onto it holding the rods 42 securely into the slots 50. This interlocking of the two parts may be accomplished by utilizing a flange 58 or other suitable interlocking method and a snap fastening device such as shown in FIG. 7 where the projection 62 slides and snaps into the fastener 60.

Thus it can be seen that permanent mounting brackets provide a method of quickly and conveniently discarding and replacing the scratching post which is in reality the scratching element to which the cat applies his paws after it becomes worn without having to remove or replace screws, or use tools of any kind. By unsnapping and removing part 44b, the upper ends of the rods are released so that the body of the post can be pulled forward at the top and lifted out of the lower retaining holes 48. A new post installed in the reverse order after inserting the rods through it. The permanent mounting brackets themselves are also specifically designed to be maximally adaptable and versitile in being secured to walls, floors or other surfaces.

An alternate embodiment would be to make the scratching post or element reversible for longer and in effect double life. This could be achieved in several ways, such as by duplicating the basic structure of the post, as shown in FIG. 2, and fastening two of them back to back, but may with preferably only one set of holes 30 to form a symetrical post. Alternately, the backing plate 12 could be omitted entirely with only a longitudinal support 64 on each side as shown in FIG. 8. Further still, the supporting structures 64 could also be eliminated leaving only the stacked sheets adhesively secured to each other to form the post while the securing rods 42 could provide much or most of the overall structural rigidity. Secured by rods 42, the scratching element may also consist of several sections or segments rather than one continuous column such as shown in FIG. 9.

This same replaceable scratching element, particularly if in the form of sections, could be modified slightly and held in place by an alternative general supporting structure shown in FIG. 9. This alternative framework, made of metal, plastic, wood or other suitable material, and having integral flanges or attachable brackets 68 and 70 for securing the structure to the wall and floor or other surface, includes an open channel formed by the back 72 and two sides 74 each having at its front edge an inward pointing flange 76 that serves to secure the replaceable scratching element sections 78. Each edge of the scratching element or section has a groove or channel, 80, substantially along its midline designed to fit closely over flanges 76 as shown in FIG. 9. If the side supporting structures 64 are used, the two meeting edges of the folded structure could face outwardly and provide the necessary groove 80. The bracket 68 holds the top of the supporting frame away from the wall sufficiently to allow the scratching element sections 78 to be inserted into the frame from the top with the grooves 80 sliding onto and being secured by the two flanges 76. The bottom element can be allowed to extend to the floor or rest upon a small flange or stopping or abutment means 82 formed on the bottom of the frame's back 72 or sides 74 and preferably extending into the channel opening. In this manner the scratching element sections are again replaceable and reversible both top to bottom and back to front for extended life.

Alternatively, as well, the device can be made to be fully self supporting and having a replaceable two or three dimensional scratching element as shown in FIG. 10. The main supporting structure in this instance can consist of a flat base 84 supporting a substantially centered vertical post 86 that in turn holds the replaceable scratching element 88. For strength or aesthetic purposes, the base 84 may include a circumscribing ridge or rail, 90, as shown in FIG. 10, such that the top surface of the base is recessed and made more suitable for the application of decorative material such as rug, or of a pad forming an additional surface for scratching and clawing. Such a scratching pad could be replaceable and similar in material construction to that, 28, described earlier, except that it could be thinner, designed to cover all or most of the base, and be held down firmly to the base by some simple means such as screws or suitable adhesives. The base and post may be round, square, or other shape and be made of wood, plastic, metal or other suitable material to provide a sufficient degree of strength, durability, and even aesthetic qualities. The scratching element as well as the post may be made removable for shipping or other purposes, and may have a small flange, block, or dowel located on one or more of its sides or a pin extending through it designed for the bottom edges thereof to rest upon and thus hold it at the proper elevation and keep it from sliding to the bottom. The scratching element and the post holding the same, may be designed to fit onto parts being round, square, or other shapes so long as the scratching element fits reasonably snuggly onto the post. The scratching element 88 is made of the same material 24 as described earlier, but in this case a multi-dimensional scratching surface can be achieved. In the example of a square post made of corrugated cardboard the corrugations of the corrugated layers could all lie in the smae direction, thus occurring perpendicular to the surface of two opposing sides, forming the most desirable scratching medium, and parallel to the surface of the other two opposing sides, forming a less desirable scratching medium. More preferably, the scratching element would be constructed as shown in FIG. 10 where the corrugations on all sides would occur approximately perpendicular to each respective surface of the element. This effect may be achieved by joining the stacked layers at the corners, as indicated in FIG. 10, or by other means. For functional, aesthetic, or other purposes, the top of the scratching element may be covered with any suitable material including an additional scratching surface to render the element scratchable on five surfaces and in all three dimensions. This can be easily achieved by making the top surface the same as that of the sides as shown in FIG. 10.

To enhance the attractiveness of the device to cats, it may be impregnated or sprayed with something like catnip or even have leaves of catnip placed between the corrugated layers. Further, the device may be of any size, that is low or high, so that the cats will try to climb up much like climbing up a tree or bush, and may be of any width, so that more than one cat can use it at the same time.

Although the invention has been described herein, it is understood that various changes may be made in size, shape, materials or arrangement without departing from the spirit and scope of the invention as claimed.

Having herein described the invention, what is claimed as new is:

1. A cat scratching post device comprising a main backing plate, a plurality of stacked, planar climbing sheets disposed on said main backing plate and extending outwardly therefrom and support means, said support means comprising a wall plate secured to said main backing plate, bottom flange bracket means carried by said wall plate for extending outwardly from a room wall, and upper wall engaging means carried by said wall plate at its upper end portion for engaging the upper portion of said wall plate directly to said room wall, and bottom flange bracket means constraining said wall plate into an angular deviation relative to the verticality of said room wall, whereby said main climbing and scratching means is supported in an inclined disposition out of the vertical for facilitating scratching and climbing thereof.

2. The device as claimed in claim 1, comprising end flange means carried by edges of said main backing plate to define an outwardly open main channel recess for receiving inner marginal edge portions of said stacked climbing sheets, and adhesive means for securing said marginal edge portions inside said main channel recess.

3. The device as claimed in claim 1, comprising catnip means carried by said scratching post devise for attracting cats thereto.

4. The device as claimed in claim 1, wherein said scratching body is reversible.

5. A device as claimed in claim 1, wherein there are two scratching bodies positioned back to back.

6. A device as claimed in claim 1, wherein said main backing plate is in substantial longitudinal contact with said scratching means for support thereof.

7. The device as claimed in claim 1, wherein said climbing sheets are formed of a plurality of alternating composite sheet material.

8. The device as claimed in claim 7 wherein said climbing sheets are formed of a plurality of corrugated cardboard and extend outwardly from said main backing plate in a direction for cats to scratch and climb thereon.

* * * * *